United States Patent [19]
Derman

[11] Patent Number: 6,126,135
[45] Date of Patent: Oct. 3, 2000

[54] ROTATABLE CABLE ATTACHMENT DEVICE FOR SECURING PORTABLE EQUIPMENT

[76] Inventor: Jay S. Derman, P.O. Box 3823, Palos Verdes, Calif. 90274-9533

[21] Appl. No.: 09/377,708

[22] Filed: Aug. 20, 1999

[51] Int. Cl.[7] .................................................. F16M 13/00
[52] U.S. Cl. ...................... 248/551; 248/73; 248/74.4; 248/74.5; 248/220.21; 248/56; 174/135
[58] Field of Search ..................................... 248/551, 552, 248/214, 306, 222.52, 220.21, 73, 68.1, 65, 56, 349.1, 316.6, 74.4, 74.5; 403/90, 110; 292/281, 285, 286; 174/72 A, 135

[56] References Cited

U.S. PATENT DOCUMENTS

| | | | |
|---|---|---|---|
| 4,344,593 | 8/1982 | Canto | 248/73 |
| 4,702,443 | 10/1987 | Callaway | 248/51 |
| 4,910,362 | 3/1990 | Kinner | 174/135 |
| 5,806,813 | 9/1998 | Binelli | 248/74 |
| 5,873,550 | 2/1999 | Phillips | 248/73 |
| 6,070,835 | 6/2000 | Stillinger | 248/56 |

*Primary Examiner*—Ramon O Ramirez
*Assistant Examiner*—A. Joseph Wujciak, III
*Attorney, Agent, or Firm*—Monty Koslover

[57] ABSTRACT

A revolving top, cable attachment device that provides a means for attaching a wire cable or a padlock to any portable equipment having at least one generally flat surface or edge. It is particularly useful for securing equipment where either the cable or equipment may be rotated. A metal or plastic circular shaped pad provides a base that can be bonded to a side of an equipment. An upper portion provides a tunnel-like cable housing through which a cable or padlock shackle may pass. The upper portion is fastened by a center pin to the base at its center in a manner allowing the cable housing to rotate 360 degrees freely with respect to the base. The device is strong, ruggedly made and inexpensive.

3 Claims, 2 Drawing Sheets

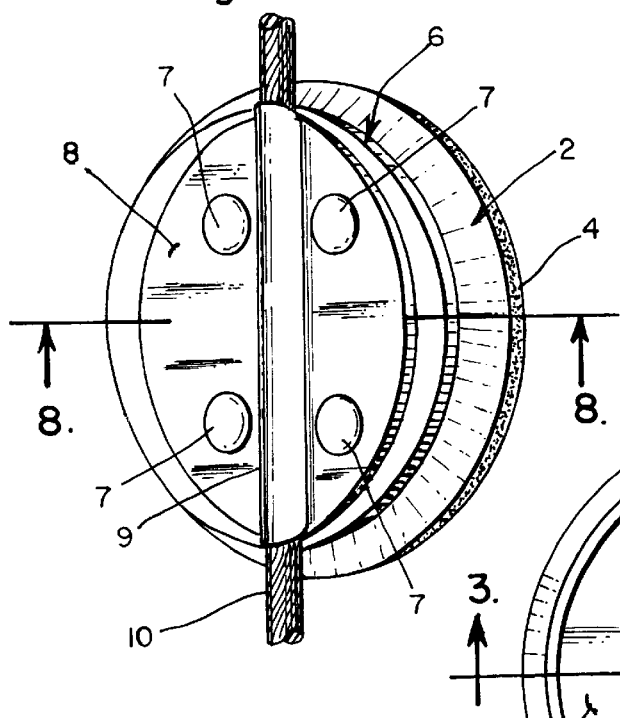
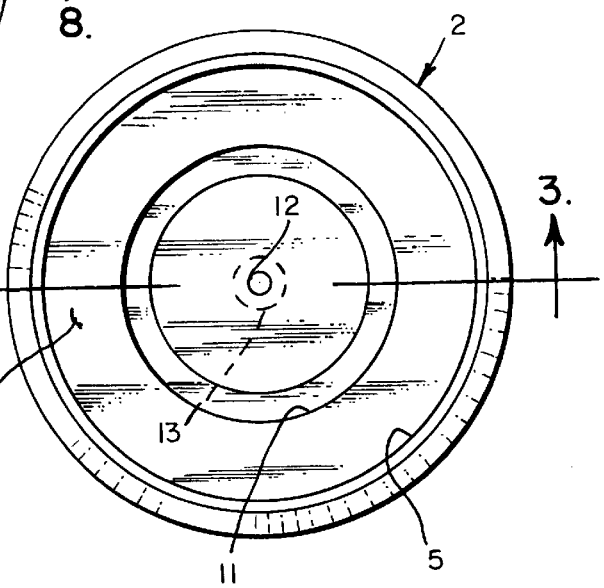
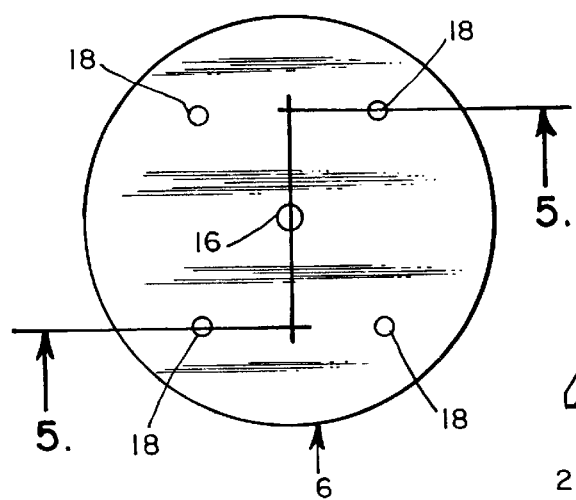
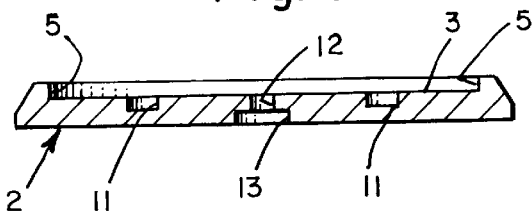

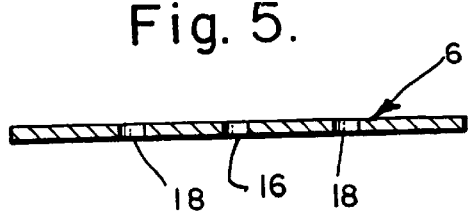
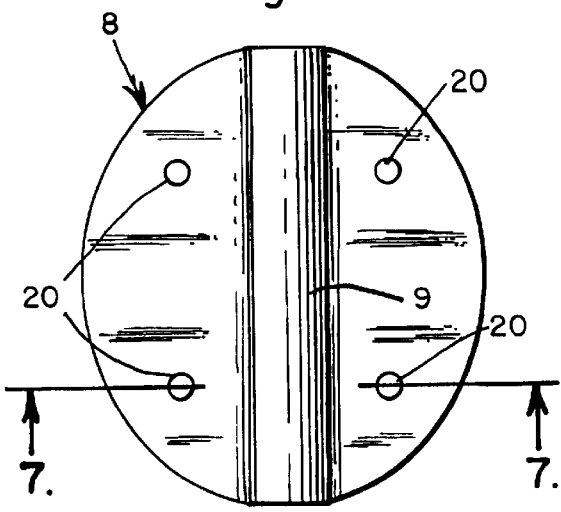
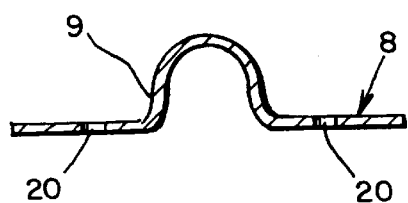
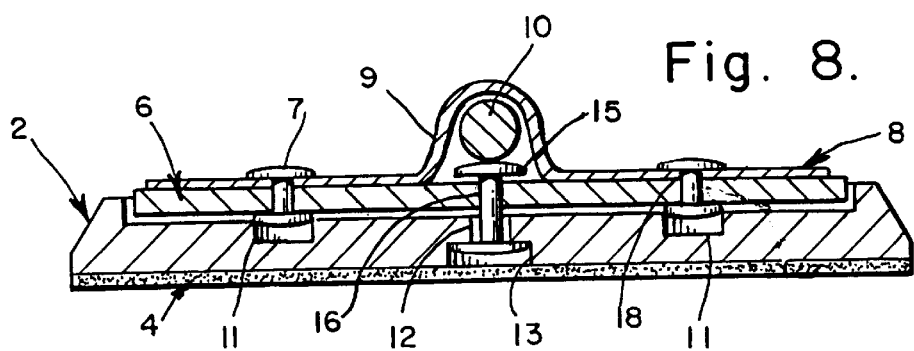
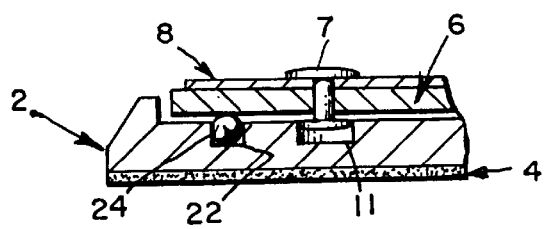

ROTATABLE CABLE ATTACHMENT DEVICE FOR SECURING PORTABLE EQUIPMENT

BACKGROUND OF THE INVENTION

1. Field of the Invention

This invention relates to devices used to attach a wire cable or padlock to portable equipment having flat sides, and more particularly for attachment to equipment that needs to be rotated.

2. Background

Many portable equipments such as PC's, monitors, printers VCR's and tools incorporate no universal means of securing them from being moved away, whether deliberately or not.

Most of these equipments have generally flat sides and edges to which a device could be attached. In response to this need, there exist a number of devices that may be attached to the sides of portable equipment for the purpose of securing it. However, most of these devices are complex and expensive and therefore are not favored by potential users.

Furthermore, there are applications such as in special displays or usage, where equipment may be continuously rotated through an are. There are few currently available attachment devices that could be used for these applications.

SUMMARY OF THE INVENTION

The present invention for a rotatable cable attachment securing device for portable equipment was filed with the USPTO as Document No. 454600 under the Disclosure Document Program filed Apr. 14, 1999. The invention provides a means for attaching a wire cable or a padlock to any portable equipment having at least one generally flat surface or edge. It is particularly useful for securing equipment that is rotated, either occasionally or continuously. A metal or plastic circular shaped pad provides a base that can be bonded to a side of an equipment. One or two circular, metal members provide a tunnel-like housing through which a cable or padlock shackle may pass. These circular members are fastened to the base at their center in a manner allowing them to rotate 360 degrees freely with respect to the base. The device is simply constructed and inexpensive.

The principal object of this invention is to provide a means for attaching a wire cable or padlock shackle to portable equipment.

Another object is to provide an attachment for cables to portable equipment that will allow equipment to be rotated 360 degrees while attached to a cable.

An advantage over currently available attachment devices is the simplicity and relatively low cost of the invention device.

Further objects and advantages of the invention will be apparent from studying the following portion of the specification, the claims and the attached drawings.

BRIEF DESCRIPTION OF THE DRAWINGS

FIG. 1 is a generally perspective view of the preferred embodiment device being used with a wire cable for attachment to a side of portable equipment;

FIG. 2 is a top view of the base member according to the present invention, particularly showing a circular groove for clearance rotating projections;

FIG. 3 is a cross-section elevation view of the base member taken along line 3—3 of FIG. 2;

FIG. 4 is a top view of a disc member that fits in a circular recess on the top of the base member and can be fastened and rotate with respect to the base member;

FIG. 5 is an elevation cross-section view of the disc member, taken along line 5—5 of FIG. 4;

FIG. 6 is a top view of a tunnel housing that is intended for fastening to the disc member;

FIG. 7 is a cross-section elevation view of the tunnel housing taken along line 7—7 of FIG. 6;

FIG. 8 is an elevation cross-section view of the assembled device taken along line 8—8 of FIG. 1; and FIG. 9 is a partial, elevation cross-section view of the assembled device, particularly showing the addition of ball bearings and bearing holder recesses to the base member to support the rotating edges of the disk member.

DESCRIPTION OF THE PREFERRED EMBODIMENT

Referring particularly to the drawings, there is shown in FIG. 1 a perspective view of the preferred embodiment of a rotatable cable attachment device according to the present invention. The device is shown with a wire cable 10 running through a channel 9 that is shaped in the top member 8, to illustrate how the device is used.

The top member 8, which is a tunnel housing, is fastened to a disc member 6 that in turn, is held by a center pin 15 to a base member 2, which allows the disc member 6 to rotate freely 360 degrees around the base member 2. Attached to the bottom surface of the base member 2 is a bonding layer 4 which serves to bond the device to a convenient flat side or edge of an equipment. A cross-section view of the device is shown in FIG. 8 to help in understanding the device mechanism.

In FIGS. 1 and 8, four rivets 7 are shown fastening the top member 8 to the disk member 6. Other means of fastening may be used, including threaded screws with or without locknuts, or even welds. The selected method depends primarily on the size, projected cost of the device and material used, which will vary according to the device application.

Refer now to FIGS. 2 and 3 which are respectively, a top view and a cross-section view of the base member 2. The base member 2 is a metal or plastic circular shaped pad, made sufficiently thick for strength. A large diameter recessed receiving portion 3 is out or formed in the top surface of the base member 2 for the purpose of receiving the disc member 6 with allowance for rotation. The walls 5 of the receiving portion 4 are made sharply vertical to enclose the disc member's rotatable edge as far as possible.

A circular opening 12 for a center pin is located at the central point of the receiving portion 3, out on an axis going through the plane of the base member 2. A center pin 15 is used to support and secure the disc member 6 to the base member 2, allowing the disc member 6 to rotate. A recessed portion 13 is countersunk in the center of the bottom surface of the base member 2, providing space for any means needed for holding the center pin 15 to the base bottom and preventing the center pin from being pulled out.

A circular, deep groove 11 is made in the surface of the receiving portion 3, concentric with the pin opening 12, for the purpose of providing clearance for any fastening portions that project under the disc member 6 when the device is assembled. As shown in FIG. 8, the groove 11 provides clearance for the projecting bottom ends of the rivets 7 that fasten the top member 8 tunnel housing to the disc member 6. The groove 11 would not be needed if the fastening means did not protrude beyond the bottom surface of the disc member 6.

Refer now to FIGS. 4 and 5 which are a plan view and a cross-section view of the disc member 6. The disc member 6 is a circular, rigid planar member that is sized to fit in the receiving portion 3 of the base member 2. It includes a second hole 16 out in its center for receiving a center pin 15, and when screws or rivets are used as fasteners for the disc, a number of fastening holes 18 for passing and attaching rivets or screws. The disc member 6 may be made of metal or a rigid plastic material.

The third major component of the device is the top member 8 tunnel housing which is shown in a top view in FIG. 6 and cross-section view in FIG. 7. This member is simply a piece of flat, rigid material that has a central portion bent and curved to form a channel 9 across the entire width of the member. The channel width is sized to receive a wire cable 10 comfortably and its depth is sized to also include the height of a center pin 15 head that will protrude above the top of the disc member 6 surface when the device is assembled.

A number of fastening holes 20 are cut in the top member 8 corresponding in location and size, to the fastening holes 18 cut in the disc member 8. These fastening holes 20 are required to accommodate the rivets or screws used to fasten the top member to the disc member 8.

FIG. 8, which is a cross-section of the device, illustrates how the device is assembled from its four major parts: base member 2, disc member 6, top member 8 and center pin 15, plus fasteners 7 and an adhesive layer 4 which is a bonding means. It should be understood that fasteners may be used either to augment the adhesive layer or instead of it to attach the device to an equipment.

The top portion of the device, which here is made of two members joined together, can be made to rotate freely so that the channel that houses a cable can rotate through 360 degrees continuously oscillate in an arc of less than 360 degrees or simply move occasionally through one angular position to another as may be required. This characteristic confers considerable flexibility of usage on the device, allowing it to be used with moving equipment as well as with statically placed equipment.

When the device is intended for attachment to a relatively large or heavy equipment, it is made larger in diameter and thickness, and uses strong materials for all parts. The disc member's edges may require support during rotation because of the heavy or larger equipment and cable. Therefore, a number of ball bearings 22 are nested in cupped recesses 22 around and near the perimeter of the base member 2 receiving portion, to provide the required support. This is illustrated by the partial cross-section view of the device assembly in FIG. 9.

The present invention cable attachment device may be used with only one device attached to the side or edge of an equipment, or two or more devices may be used. This depends on the application. For securing an equipment in place, only one device may suffice, whereas for supporting an equipment, at least one device on opposite sides of the equipment will be needed.

It should be noted that the attachment device can also be used to provide a rotatable axis, using two devices, for an equipment supported by a fixture.

An advantage of the invention device over currently available attachment devices is its rugged, strong construction, particularly in rotation, making it difficult to be broken or removed from an equipment to which it is attached. The device and the equipment is thus more secure for all applications.

As described, the rotatable cable attachment device is simple in concept and design and economic to produce. It's use is straightforward and requires no special preparation of the portable equipment. The bonding method used to attach the device to equipment is tough, reliable, and not easily removed, ensuring a secure attachment.

Plainly, the preferred embodiment described above achieves the objects of the present invention. Alternative embodiments and various modifications may be apparent to those skilled in the art. These alternatives and modifications are considered to be within the spirit and scope of the present invention.

What is claimed is:

1. A rotatable top, cable fastening assembly for attachment of a cable or padlock shackle to portable equipment, said cable fastening assembly comprising:

(a) a top member-formed of flat, rigid sheet and having a generally circular shape, said top member including a channel formed along its long axis, said channel having a width and depth its sufficient to comfortably receive a wire cable and the head of a support pin with clearance;

(b) a circular, rigid disc member, said disc member including a first hole cut vertically through its center axis, said first hole having a diameter sufficient to pass a support pin;

(c) first means for fastening said top member to said disc member, including a plurality of rivets that are inserted in a plurality of holes out in said top member and through matching holes cut in said disc member, said top member being centered on said disc member when fastened in place, forming a fixed upper portion having a tunnel-like opening through which a wire cable or shackle may be passed;

(d) second means for supporting said fixed upper portion, including a large rivet that is inserted through said first hole and projecting below said disc member, providing a rotatable support pin for said upper portion;

(e) a circular, planar base member having a circular recessed receiving portion cut in its top surface, said receiving portion having a diameter and depth sufficient to receive and enclose said disc member with edge and bottom clearance, said receiving portion having a planar surface including a centrally located second hole having a diameter sized to receive said support pin with clearance for rotation, said receiving portion including a circular, deep and wide groove concentric with said second hole to provide clearance for fastening projections under said disc member; said base member having a flat bottom surface including a countersunk portion centered on said second hole, said countersunk portion sized to hold the bottom end of said rotatable support pin and a pin fastening, preventing said pin from being pulled out while allowing pin rotation; and (f) bonding means attached to said bottom surface of said base member for bonding said base member to an equipment surface or edge; said upper portion being supported by said support pin in said base member such that said upper portion may be freely rotated 360 degrees while enclosing a portion of wire cable or a padlock shackle.

2. The cable fastening assembly according to claim 1 wherein said second means includes a pin member having a head at one end and a threaded portion at its distal end, including a locking agent to secure said pin member to said base member.

3. The cable fastening assembly according to claim 1 wherein said base member includes a multiplicity of ball bearings, nested in the surface of said recessed receiving portion and located spaced around its perimeter, providing support to the periphery of said upper portion while said upper portion is rotating.

* * * * *